(12) United States Patent
Zeng

(10) Patent No.: US 8,908,942 B2
(45) Date of Patent: Dec. 9, 2014

(54) FILTERED BACKPROJECTION IMAGE RECONSTRUCTION WITH CHARACTERISTICS OF AN ITERATIVE MAP ALGORITHM

(75) Inventor: Gengsheng Lawrence Zeng, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 577 days.

(21) Appl. No.: 13/279,195

(22) Filed: Oct. 21, 2011

(65) Prior Publication Data

US 2013/0101194 A1 Apr. 25, 2013

(51) Int. Cl.
*G06K 9/00* (2006.01)
*G06T 11/00* (2006.01)

(52) U.S. Cl.
CPC ............... *G06K 9/00* (2013.01); *G06T 11/003* (2013.01)
USPC ........................................ 382/128; 382/131

(58) Field of Classification Search
CPC ............ G06T 11/006; G06T 2211/416; G06T 2211/424; G06T 11/003; G06K 9/00
USPC .................................................. 382/128, 131
See application file for complete search history.

(56) References Cited

U.S. PATENT DOCUMENTS

| 7,015,477 | B2 * | 3/2006 | Gunter ........................ 250/369 |
| 7,187,794 | B2 * | 3/2007 | Liang et al. .................. 382/131 |
| 7,233,022 | B2 * | 6/2007 | Park et al. ...................... 257/66 |
| 7,345,283 | B2 * | 3/2008 | Gunter ......................... 250/369 |
| 7,653,229 | B2 * | 1/2010 | Kaufhold et al. ............. 382/131 |
| 7,737,406 | B2 * | 6/2010 | Vija et al. ................. 250/363.04 |

OTHER PUBLICATIONS

Cao, G. et al., "Noniterative MAP Reconstruction Using Sparse Matrix Representations," IEEE Transactions on Image Processing, Sep. 2009, vol. 18, No. 9, IEEE.

\* cited by examiner

*Primary Examiner* — Tom Y Lu
(74) *Attorney, Agent, or Firm* — Michael Best & Friedrich LLP

(57) ABSTRACT

Systems and methods are provided which utilize a fast, efficient filtered backprojection algorithm that can provide noise suppression advantages of an iterative MAP reconstruction algorithm. In some embodiments novel filtered backprojection systems are able to provide an image which emulates an image from an iterative algorithm corresponding to a selected iteration by utilizing control parameters which shape the filter accordingly during the reconstruction process. For example, if a user desires an image which would correspond to the one-hundredth iteration of an iterative algorithm, embodiments can provide a similar quality image using minimal calculation steps. Further, embodiments may provide the resolution quality of such an iteration while also allowing for better shift-invariant performance than an iterative method.

21 Claims, 4 Drawing Sheets

Iterative MAP vs. FBP-MAP with β = 0 (i.e., no Bayesian term)

| | Iteration index k = 2 | k = 20 | k = 200 |
|---|---|---|---|
| Iterative result |  |  |  |
| FBP result |  |  |  |

Iterative MAP vs. FBP-MAP with β = 0.2

| | Iteration index k = 2 | k = 20 | k = 200 |
|---|---|---|---|
| Iterative result |  |  |  |
| FBP result |  |  |  |

Iterative MAP vs. FBP-MAP with β = 0.4

| | Iteration index k = 2 | k = 20 | k = 200 |
|---|---|---|---|
| Iterative result |  |  |  |
| FBP result |  |  |  |

Iterative MAP vs. FBP-MAP with β = 0.2 using non-uniform angular sampling

| | Iteration index k = 2 | k = 20 | k = 200 |
|---|---|---|---|
| Iterative result |  |  |  |
| FBP result |  |  |  |

FILTERED BACKPROJECTION IMAGE RECONSTRUCTION WITH CHARACTERISTICS OF AN ITERATIVE MAP ALGORITHM

TECHNICAL FIELD

The present application is directed toward image reconstruction methods; and more specifically toward utilizing improved filtered backprojection methods.

BACKGROUND OF THE INVENTION

In tomography, multiple methods are utilized for image reconstruction purposes. Differing methods have advantages and disadvantages in terms of quality, computational efficiency, and the like.

One such method is called Filtered Backprojection (FBP). FBP methods are generally seen as simple and fast methods for use in image reconstruction. Such methods are commonly used in Nuclear Medicine, x-ray computed tomography (CT) or even magnetic resonance imaging (MRI) applications which utilize certain special data acquisition methods. FBP algorithms generally are Fourier transform-based methods that control noise by using window functions and carefully designed cut-off frequencies. In implementation, raw image data is sent through a high pass filter (typically a ramp filter) to provide image sharpness. Then, a backprojection step assigns all the filtered data back to the image in order to reconstruct a higher quality image.

One advantage of FBP methods is that they are seen as being very fast. However, disadvantages occur because FBP generally requires a very uniform sampling of the object to be imaged. Additionally, FBP methods are prone to noise which is oftentimes difficult to control. In fact, currently in nuclear medicine applications, e.g., positron emission tomography (PET) and single photon emission computed tomography (SPECT), FBP has become disfavored because of the excess image noise.

Another common type of method used for image reconstruction may be referred to as an iterative algorithm method. Compared with FBP methods, iterative methods generally produce images which are less noisy, even when the iterative algorithm (e.g., an iterative Landweber algorithm) does not model the projection noise or does not model the projection noise correctly. As a result, FBP methods have gradually been replaced by iterative image reconstruction algorithms, among which the maximum-likelihood expectation-maximization (ML-EM) and ordered-subsets expectation-maximization (OS-EM) algorithms are the most popular.

Iterative algorithms may also utilize prior information for future processing iterations. Such a use can assist in reducing noise, reducing modeling error, etc., in order to provide higher quality images. Additionally, in an iterative technique, raw data sampling does not have to be uniform. Such functionalities are generally not possible when using FBP techniques.

One disadvantage to iterative algorithm methods is that they are generally much slower than FBP methods. For example, when reconstructing an image, an iterative algorithm may run 50-100 iterations, and for each iteration, the processing cost is generally twice as much as the computer processing cost of a single FBP reconstruction. As such, if a user implements 100 iterations, the image reconstruction may be as much as 200 times slower, however, it generally produces better images. For certain tomography applications this may be acceptable. However, when implementing some imaging techniques, such as a CT scan, the raw data received is too large to implement such an iterative algorithm.

Another disadvantage of iterative methods is that the image produced generally cannot have a shift-invariant property. In other words, the point spread function or point response function is not stationary. With FBP, the point response function or point spread function is shift invariant. In implementation, this means that if you have a point, a source, or a lesion in the body, depending on the body location of the source, an FBP method can produce the same image regardless of scan location, but iterative methods produce different images corresponding to the location of the source. This is especially true if the lesion is on the edge of the image area.

Other approaches to provide for more efficient and high quality image reconstruction may be characterized as hardware approaches. For example, some methods utilize a graphic processing unit (GPU) or parallel processing techniques in an effort to perform multiple tasks simultaneously. These approaches may utilize multiple computers and processing devices (sometimes involving 100+ processors) in order to process large amounts of raw data. However, such approaches tend to be expensive or difficult to implement.

SUMMARY

The present application provides systems and methods which utilize a fast, efficient FBP algorithm that can provide noise suppression advantages of an iterative MAP (maximum a posteriori) reconstruction algorithm. In some embodiments novel filtered backprojection systems are able to provide an image which emulates an image from an iterative algorithm corresponding to a selected iteration by utilizing control parameters which shape the filter accordingly during the reconstruction process. For example, if a user desires an image which would correspond to the one hundredth iteration of an iterative algorithm, embodiments can provide a similar quality image using minimal calculation steps. Further, embodiments may provide the resolution quality of such an iteration while also allowing for better shift-invariant performance than an iterative method.

In example embodiments, an FBP algorithm with the similar result characteristics of an iterative MAP algorithm are provided. This new FBP algorithm can be applied to a projection data set that is not uniformly sampled. Further, in one embodiment, based on the formulation of the iterative Landweber algorithm, a frequency-domain window function is derived for each iteration of the Landweber MAP algorithm. The resultant window-function has an index k, emulating the characteristics of the Landweber algorithm at the kth iteration. The window function also has a parameter $\alpha$ corresponding to the step-size of the iterative algorithm, and also a parameter $\beta$ that is the relative weighting between the fidelity term and the Bayesian term. Computer simulations show that the new FBP-MAP algorithm with window function index k and the iterative Landweber MAP algorithm with iteration number k give similar reconstructions in terms of resolution and noise texture. As such, this embodiment allows analytical FBP algorithms to provide similar results to the iterative MAP algorithm if the ramp filter in the FBP algorithm is modified and scaled by a specially designed window function. Additionally, in one embodiment non-uniform sampling and sensitivity can be accommodated by proper weighting.

Embodiments may be implemented in methods utilizing any tomography device. For example, embodiments may provide image reconstruction for raw data received from devices such as an x-ray CT, PET, SPECT, MRI, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
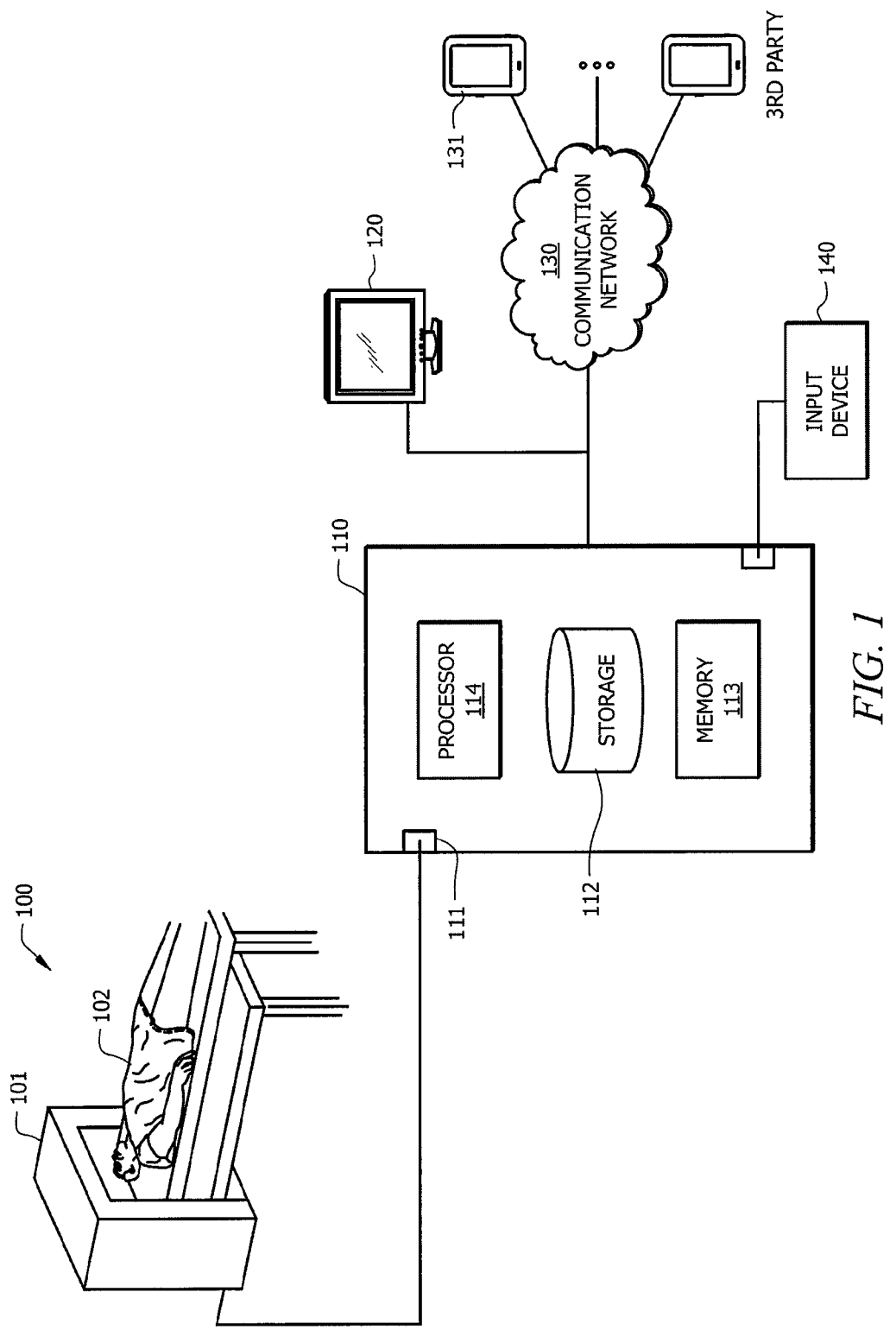
FIG. 1 represents a system for providing a reconstructed image in accordance with an embodiment of the present application.

FIG. 1 represents a system 100 for providing a reconstructed image in accordance with an embodiment of the present application. System 100 includes an image acquisition system 101. Image acquisition system 101 collects raw image data corresponding to a subject 102 to be imaged and may be any acquisition system which provides raw data in the form of a Radon transform, attenuated Radon transform, raysum, plane-sum, k-space data, and the like. Additionally, in accordance with some embodiments, image acquisition system 101 may acquire data where the data acquisition trajectory can be one of a regular circle, helix, and an irregular shape. Example image acquisition systems 101 may include tomography machines such as a CT, PET, SPECT, or MRI machine may be utilized to generate such raw data.

Image processing device 110 is configured to receive raw image data from image acquisition system 101 and utilize image reconstruction techniques to generate a final image. Image processing device 110 includes an input/output port 111 for sending and receiving information between acquisition system 101 and image processing device 110. Received data may be stored in storage device 112 or in short term memory 113 while undergoing processing.

Image processing device 110 further includes processor 114. Processor 114 may be configured to execute processing algorithms to conduct image reconstruction. Such algorithms may be implemented using one or more software programs which are stored within image processing device 110 or provided remotely. In accordance with embodiments of the present application, image processing device 110 may be configured to implement novel FBP algorithms which emulate reconstructed images corresponding to a selected iteration of an iterative algorithm technique without having to calculate multiple iterations as would be required by the iterative technique.

More specifically, in accordance with an embodiment, it is recognized that once the relationship between an FBP algorithm and an iterative algorithm is known (typically in the frequency domain, but may be implemented in the spatial domain), an FBP technique may be utilized to provide results which emulate an iterative reconstruction. Specifically, the novel FBP technique may utilize a filter shape which is controlled by a parameter k. If k=1, the resulting image would correspond to the first iteration of an iterative algorithm. Similarly, if k=100, the resulting image would correspond to the $100^{th}$ iteration. Unlike traditional Fourier transform filter design, where a user may specify the cutoff frequency, the rolloff rate, cutoff frequency, and the like, embodiments do not need to specify cutoff frequency. Instead, they will use the parameter k.

Further, embodiments may also account for shift-invariant properties from the obtained data. Additionally, embodiments may be useful in the presence of non-uniform sampling. This may be accomplished in some embodiments by utilizing a weighting function which accounts for such sampling.

Once image processing device 110 reconstructs an image, such an image may be output to a display device 120, transmitted across a communication network 130 and provided to one or more third party sources 131, stored within storage 112 for later use, etc. In other words, a reconstructed image may be stored or distributed in any manner after processing. It is noted that other common image reconstruction processes may be utilized along with embodiments of the present application such as raw data pre-processing and post-reconstruction filtering. Such processes are known and are not discussed herein.

System 100 may further include user input device 140 for providing user input into processing device 110. Such user input may be utilized to control acquisition device 101, modify parameters for reconstruction within image processing device 110, etc. It is noted that image processing device 110 may be part of the control system for image acquisition device 101 or may be a separate processing device utilized after the acquisition system has completed its functionality. Embodiments are not necessarily limited to the placement or configuration of the processing and control systems.

Figure 2:
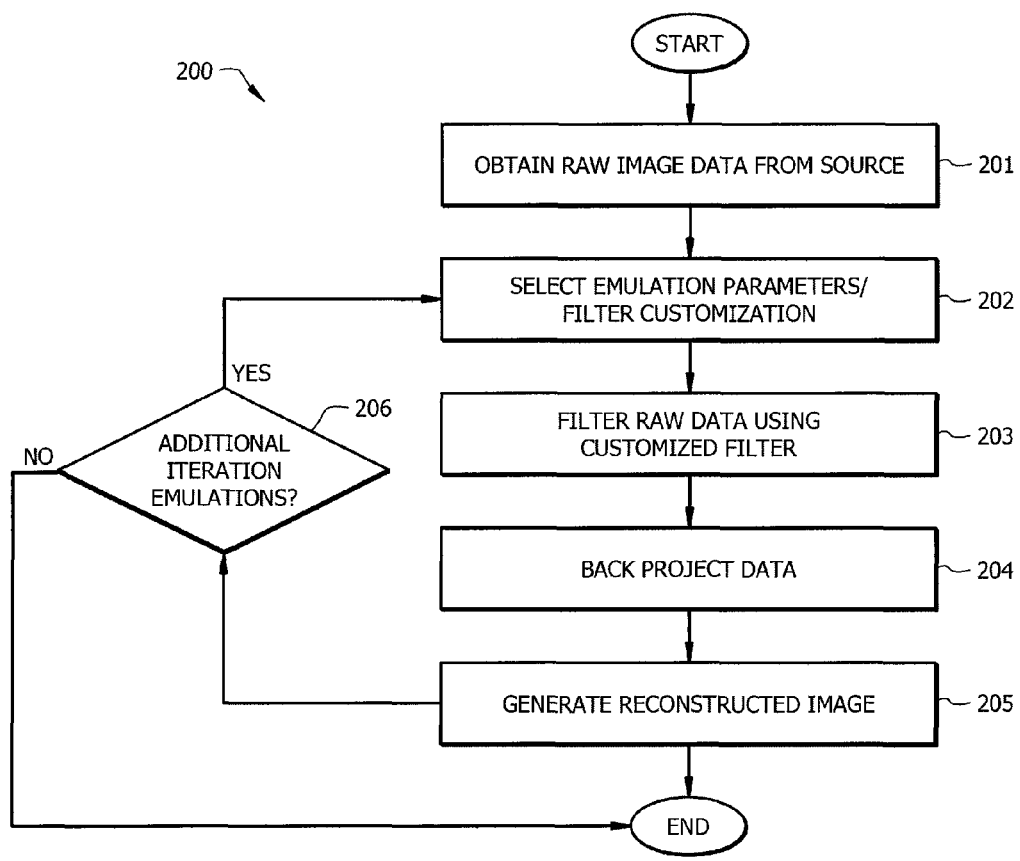
FIG. 2 illustrates a flowchart for a method of conducting image reconstruction in accordance with an embodiment of the present application.

FIG. 2 illustrates a flowchart for a method 200 of conducting image reconstruction in accordance with an embodiment of the present application. It is noted that the steps shown on the flowchart of FIG. 2 are set by way of example, and various modifications, e.g., changes in the order of steps, may be made which are considered within the scope of the present application. Method 200 begins with obtaining raw image data 201 from an image source. Such data may be received in the form of a Radon Transform representing line integrals of the object being imaged. Raw image data may be obtained from any source such as a CT, PET, SPECT device, and the like. For example, such data may be obtained using device 101 of system 100 as shown in FIG. 1.

A selection of iterative emulation filter parameters and other filter customization is implemented at step 202. These parameters may be selected to provide image results in accordance to the embodiments described herein. For example, a parameter k may be selected which produces an emulated result which corresponds to a specific iteration which would be obtained using an iterative technique. In some embodiments multiple parameters may be selected in order to provide for a range of images corresponding to various iterations (e.g., to account for the tradeoff between a fidelity term and a Bayesian term). Other filter parameters may also be selected which correspond to various applications, for example, the step size in the iterative algorithm and the relative weighting of the Bayesian term. Embodiments may allow the user to have the freedom to choose the Baysian model matrix R. Such selection may be implemented using System 100 of FIG. 1. In some embodiments, filter parameters may be pre-selected and stored within image processing device 110, received from user input device 140, etc.

Once the filter parameters are selected, the raw image data may be filtered using the customized filter at step 203. The filtered data may then be backprojected at step 204. Once the image is backprojected, the image is in the image domain and may be the final image. Such filtering and backprojection may be implemented using any processing device configured to execute a program which facilitates the image processing, e.g., the image processing device 110 within system described above with respect to FIG. 1.

With the FBP processing complete a reconstructed image may be generated at step 205. This generated image represents an improved image over devices using previous FBP algorithms and is implemented in a simple manner with respect to iterative methods, while also overcoming other sensitivity problems which occur when using iterative techniques. In the event that other images are desired which correspond to additional emulated iterations, embodiments may provide for the selection of additional image parameters, e.g., at step 206.

As stated above, embodiments may implement the steps in differing order. For example, an image can also be reconstructed by first performing backprojection then performing filtering. Additionally, it is noted that filtering may be either implemented as Fourier domain multiplication or spatial domain convolution.

Example Methods

Example methods of a new FBP algorithm that emulates an iterative MAP (maximum a posteriori) algorithm are shown below. It is noted that the following is presented by way of example and that various modifications may be made based on the types of data being analyzed, particular applications, and the like. For example, the data can be in the form of parallel rays, fan-beam rays, plane sums, k-space samples, and can be in 1D, 2D, or higher dimension. The data can be acquired by over 360° or less than 360°, or can be along a regular/irregular trajectory. The data can also be attenuated either by a uniform attenuator or a non-uniform attenuator. Such modifications are considered within the scope of the novel concepts described in the present application A typical MAP algorithm is to optimize the Bayesian estimation may be represented as:

$$\hat{X} = \underset{X}{\operatorname{argmin}}\{\|P - AX\|^2 + \beta X^T R X\} \quad (1)$$

In the context of tomography, A in (1) is the projection matrix, X is the image array written as a column vector, P is the projection array written as a column vector, and β is a relative weighting factor that adjusts the importance of the Bayesian term $X^T R X$ relative to the fidelity term $\|P-AX\|^2$. The square matrix R in (1) can be understood in such a way that X is modeled by a Gaussian random field with a covariance matrix $R^{-1}$. In practice, X is not random and the matrix R is used to enforce some smoothness of the image so that the reconstruction is not too sensitive to noise. One way to promote the smoothness is to suppress the difference between the central pixel value and its neighbors. A Laplace operator that is the second-order derivative, for example, can be used in the matrix R.

The optimization problem (1) has a quadratic objective function, so the solution can be obtained by the Landweber algorithm:

$$X^{(k+1)} = X^{(k)} + \alpha[A^T(P - AX^{(k)}) - \beta R X^{(k)}] \quad (2)$$

where $A^T$ is the backprojection matrix, $X^{(k)}$ is the estimated image at the kth iteration, and α>0 is the step size. This recursive relation can be re-written as a non-recursive expression as $$\begin{aligned} X^{(k+1)} &= X^{(k)} + \alpha[A^T(P - AX^{(k)}) - \beta R X^{(k)}] \quad (3)\\ &= \alpha A^T P + (I - \alpha A^T A - \alpha \beta R) X^{(k)} \\ &= \alpha A^T P + (I - \alpha A^T A - \alpha \beta R) \\ &\quad [\alpha A^T P + (I - \alpha A^T A - \alpha \beta R) X^{(k+1)}] \\ &= \alpha A^T P + (I - \alpha A^T A - \alpha \beta R) \alpha A^T P + \\ &\quad (I - \alpha A^T A - \alpha \beta R)^2 X^{(k-1)} \\ &= \alpha A^T P + (I - \alpha A^T A - \alpha \beta R) \alpha A^T P + (I - \alpha A^T A - \alpha \beta R)^2 \\ &\quad [\alpha A^T P + (I - \alpha A^T A - \alpha \beta R) X^{(k-2)}] \\ &= \alpha A^T P + (I - \alpha A^T A - \alpha \beta R) \alpha A^T P + \\ &\quad (I - \alpha A^T A - \alpha \beta R)^2 \alpha A^T P + (I - \alpha A^T A - \alpha \beta R)^3 X^{(k-2)} \\ &= \dots \\ &= [I + (I - \alpha A^T A - \alpha \beta R) + \dots + (I - \alpha A^T A - \alpha \beta R)^k] \alpha A^T P + \\ &\quad (I - \alpha A^T A - \alpha \beta R)^{k+1} X^{(0)} \\ &= \left[\sum_{n=0}^{k} (I - \alpha A^T A - \alpha \beta R)^n\right] \alpha A^T P + \\ &\quad (I - \alpha A^T A - \alpha \beta R)^{k+1} X^{(0)} \end{aligned}$$

If the initial image $X^{(0)}$ is set to zero, the result from k iterations of the Landweber algorithm may be represented as $$X^{(k)} = \alpha \left[\sum_{n=0}^{k-1} (I - \alpha A^T A - \alpha \beta R)^n\right] A^T P \quad (4)$$

This non-iterative expression of the Landweber algorithm resembles a "backproject first, then filter" algorithm, in the sense that the projection data P are first backprojected by the operator $A^T$ and then filtered by $$\alpha \left[ \sum_{n=0}^{k-1} (I - \alpha A^T A - \alpha \beta R)^n \right].$$

When the positive real number (e.g., step size) a is small enough, the Landweber algorithm will converge to yield:

$$\alpha \left[ \sum_{n=0}^{k-1} (I - \alpha A^T A - \alpha \beta R)^n \right] \to (A^T A + \beta R)^{-1} \text{ as } k \to \infty \quad (5)$$

if $(A^T A + \beta R)$ exists, otherwise $(A^T A + \beta R)^{-1}$ is replaced by a generalized inverse. For a finite k, the equation may be represented as:

$$\alpha \left[ \sum_{n=0}^{k-1} (I - \alpha A^T A - \alpha \beta R)^n \right] = (A^T A + \beta R)^{-1} \left[ I - (I - \alpha A^T A - \alpha \beta R)^k \right] \quad (6)$$

The example Landweber algorithm is a linear algorithm, but is generally not shift-invariant. The combined operator of projection-and-backprojection plus the Bayesian term R, $A^T A + \beta R$, is nearly shift-invariant in the central region of the image array, which may be verified by putting a point source in the image, and then performing the projection-backprojection operation. After the operation, the resultant blurred point source image is nearly shift-invariant if the point source is close to the center of the image array. However, in this example when the point source is close to the array edges, the blurred point source image is generally no longer shift-invariant.

If the projection operator A is the line-integral (e.g., the Radon transform) in the two-dimensional (2D) space and $A^T$ is the adjoint operator (i.e., the backprojection transform), the combined operator of projection-and-backprojection, $A^T A$, is the 2D convolution of the original image with a 2D kernel 1/r, where $r = \sqrt{x^2 + y^2}$ in the x-y Cartesian coordinates. The 2D ramp filter is able to cancel the 1/r blurring effect. In this situation, the $(A^T A)$ operation is a 1/r convolution, the $(A^T A)^{-1}$ operation functions to provide 2D ramp filtering, and $[I-(I-\alpha A^T A - \alpha \beta R)^k]$ in (6) can be treated as a window function in the frequency domain:

$$W_k(v_x, v_y) = 1 - \left(1 - \alpha \left(\frac{1}{\|\vec{v}\|} + \beta h(\|\vec{v}\|)\right)\right)^k, \quad (7)$$

with $$\|\vec{v}\| = \sqrt{v_x^2 + v_y^2}$$

where $v_x$ and $v_y$ are the frequencies with respect to x and y, respectively, $\vec{v} = (v_x, v_y)$ is the 2D frequency vector, and h is the Fourier transform of the R when R is expressed as a convolution kernel. Thus, the conceptual shift-invariant Landweber algorithm is comparable to: first, backprojecting the data into the image domain; second, filtering the backprojected image with a 2D windowed ramp-filter defined in (7).

Non-Uniform Angular Sampling

As noted above, a conventional FBP algorithm assumes that the object is uniformly sampled. However, one embodiment of the present application may use variable sampling strategies, such as sampling the more important angular range with a smaller angular interval and sampling the less important angular range with a larger angular interval. The angular sampling can be normalized in the backprojection as a weighting function. The backprojection may be represented as an integral over the sampling angle. Further, angular sampling density compensation can be achieved by using a normalization factor in the backprojection integral, which is similar to a Jacobian factor. Mathematically, a backprojection image may be expressed as:

$$b(x, y) = \int_0^{\pi} p(t, \theta) \Big|_{t = x\cos\theta + y\sin\theta} d\theta \quad (8)$$

where p can be the raw projections at angle θ if the algorithm requires the raw projections be backprojected first, p can also be the filtered projections at angle θ if an FBP algorithm is used, and t indicates the detector bin location. A simple discrete implementation of (8) may be represented as:

$$b(i, j) = \frac{\pi}{M} \sum_{m=1}^{M} p(k, m) \Big|_{k = FIX[x\cos\theta + y\sin\theta]} \quad (9)$$

where k is the detector location index, m is the projection angle index, M is the total number of views at which projections are acquired, and "FIX" is the integral part operator. In fact, often times implementations do not use a "FIX" function, but use a linear interpolation between two neighboring detector bins. For the purposes of illustration, the simple implementation (9) is described. When the angular sampling is not uniform, it obeys a density function d(θ), which is the number of views per unit angle. For example, if the sampling interval is 1° for 0≤θ<π/4 and 3° for π/4≤θ<π, then the density function is:

$$d(\theta) = \begin{cases} 1 & \text{for } 0 \le \theta < \pi/4 \\ 1/3 & \text{for } \pi/4 \le \theta < \pi \end{cases} \quad (10)$$

and the backprojection (9) can be modified as $$b(i, j) = \frac{\pi}{\sum_{m=1}^{M} \frac{d(1)}{d(m)}} \sum_{m=1}^{M} \frac{d(1)}{d(m)} p(k, m) \Big|_{k = FIX[x\cos\theta + y\sin\theta]} \quad (11)$$

Here, the sampling density function is a function of the angle index m, instead of the actual angle θ.

Implementation

It is noted that in some embodiments a "backproject first, then filter" algorithm may also be implemented as an FBP algorithm which filters the projections first, then backprojects the image. The one-dimensional (1D) frequency-domain filter in the FBP algorithm is the 1D profile of the 2D filter in the "backproject first, then filter" algorithm. Therefore, an iterative-Landweber-MAP-equivalent FBP-MAP algorithm can be obtained, and implementation steps of an example embodiment are:

Step 1: Perform the 1D Fourier transform of the projection at each view.

Step 2: Filter the frequency domain data with a 1D windowed ramp-filter $$H_k(v_t) = |v_t| \cdot \left[1 - \left(1 - \alpha\left(\frac{1}{|v_t|} + \beta h(|v_t|)\right)\right)^k\right] \quad (12)$$

where $v_t$ is the frequency with respect to the linear variable on the 1D detector.

Step 3: Perform a 1D inverse Fourier transform of the filtered data.

Step 4: Perform the backprojection.

When $k=\infty$ and $\beta=0$, (12) is the ramp filter in the conventional FBP algorithm. Many window functions may be used to implement the present example embodiment, for example, the Hann window, the Hamming window, the Butterworth window, and so on. Similarities also exist between the windowed ramp-filter (7) and the Metz filter:

$$Metz_k(v_x, v_y) = \frac{1 - (1 - \|MTF(v_x, v_y)\|^2)^k}{\|MTF(v_x, v_y)\|} \quad (13)$$

where MTF is a frequency domain modulation transfer function (i.e., the 2D Fourier transform of the image-domain point spread function(PSF)). The Metz filter generally performs well for nuclear medicine images in handling noise. The main difference between the Metz filter and (7) is the square in the numerators. There is no Bayesian term in the Metz filter.

An alternative way to implement this new FBP algorithm is to use convolution to replace the Fourier-domain projection data filtering. The convolution kernel is the inverse Fourier transform of the Fourier-domain filter function $H_k(v_t)$ defined in (12).

Similarly, two ways can be used to implement the proposed FBP algorithm in the form of "first backprojection, then filtering." The filtering can be performed in the Fourier domain as multiplication, or can be performed in the spatial domain as convolution.

It is noted that while the above implementations are described in terms of providing 2D image reconstruction, embodiments may be utilized to produce 3D image reconstruction. For example, one method to produce a 3D image would alter the present 3D FBP algorithms by inserting an appropriate window functions that depends on the index k.

Computer Simulation Results

Example results corresponding to different computer simulations are provided herein. For these simulations, a Shepp-Logan phantom was used in computer simulation studies. Additionally, 1D parallel-hole detector was rotated over 180° with 120 views and 128 detector bins on the detector. In these embodiments, the images were reconstructed in a 128×128 array. Further, poisson noise was added to the projection data before image reconstruction in order to stimulate the practical noisy environment.

In these example simulations, both an iterative MAP algorithm and new FBP-MAP algorithms are used which have the same step-size $\alpha=0.5$, the same parameter $\beta$ (=0, 0.2 and 0.4) and the same iteration indices, e.g., k=2, 20, and 200, respectively. In order to use the same parameter $\alpha=0.5$, we scaled the iterative algorithm's projection/backprojection operator $A^T A$ by 0.00005, that is, $$X^{(k+1)} = X^{(k)} + \alpha[0.000075 \cdot A^T(P - AX^{(k)}) - \beta RX^{(k)}] \quad (14)$$

This value of 0.00005 and the parameter $\alpha$ were selected by trial-and-error. In some instances, if a step-size $\alpha$ is chosen to be too large, the iterative algorithm would diverge and the FBP algorithm would produce unreasonable images. In (14), $RX^{(k)}$ was implemented as a two-dimensional convolution with a convolution kernel shown in the table below.

TABLE 1

Example Convolution Kernel

|   | -0.5 |   |
|---|---|---|
| -0.5 | 2 | -0.5 |
|   | -0.5 |   |

It is noted that in this example, a 2D convolution kernel used in the iterative MAP algorithm to promote the smoothness of the image. Some embodiments may allow a user the freedom to choose any kernel that fits their application. For example, if the minimum energy image is desired, the identity matrix can be used as the kernel, in which the kernel only contains a value 1 at the center and zero elsewhere.

In the FBP-MAP algorithm of this example embodiment, the Bayesian operator R was a Laplacian, whose convolution kernel is {−0.5, 1, −0.5} which provides the difference between the center data value and the sum of its neighbors. The use of such a convolution kernel minimizes this difference to provide a smoothed result. The discrete Fourier transform of this kernel is h(n), which is a constant 1 minus a cosine function:

$$h(n) = 1 - \cos\left(n\frac{2\pi}{N}\right) \quad (15)$$

where n is the frequency index and N is the projection array size.

Some computer simulation results are shown in FIGS. 3-6. Each image is displayed from its minimum image pixel value (black) to its maximum image pixel value (white). No post processing of the images was performed. The negative values in the images were not altered.

Figure 3:
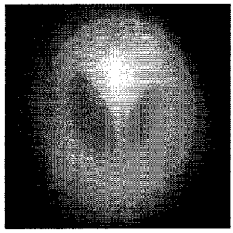
FIG. 3 illustrates an iterative MAP result versus an FBP-MAP in accordance with an embodiment of the present application with $\beta=0$ (no Bayesian term)
Figure 3:
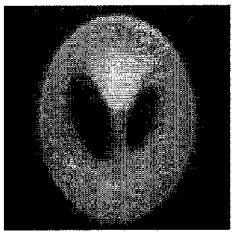
Figure 3:
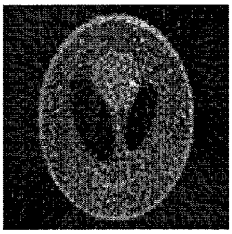
Figure 3:
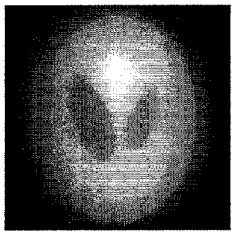
Figure 3:
Figure 3:
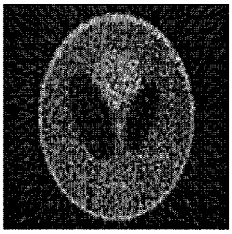

FIG. 3 illustrates an iterative MAP result versus an FBP-MAP in accordance with an embodiment of the present application with $\beta=0$ (no Bayesian term). FIG. 3 illustrates results when using an iteration index of k=2, 20, and 200. As can be seen that when no Bayesian term is used the images are in general noisy. Additionally, a smaller k gives a lower resolution image and a larger k gives a higher resolution image.

Figure 4:
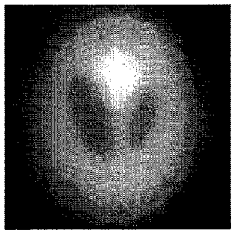
FIG. 4 illustrates an iterative MAP result versus an FBP-MAP in accordance with an embodiment of the present application with $\beta=0.2$.
Figure 4:
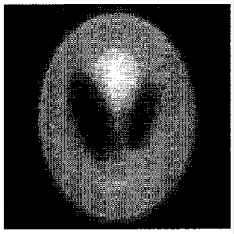
Figure 4:
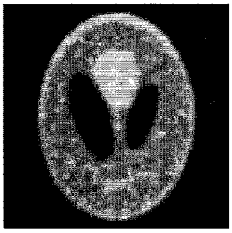
Figure 4:
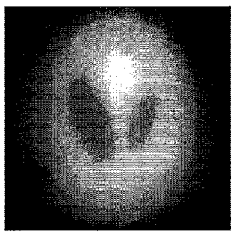
Figure 4:
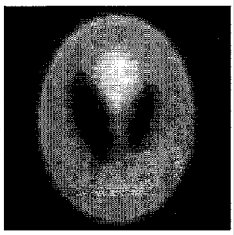
Figure 4:
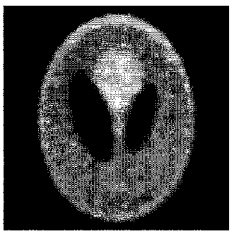

FIG. 4 illustrates an iterative MAP result versus an FBP-MAP in accordance with an embodiment of the present application with $\beta=0.2$. FIG. 4 illustrates results when using an iteration index of k=2, 20, and 200. As can be seen when the Bayesian term influence is introduced by a non-zero $\beta$, the noise is controlled.

Figure 5:
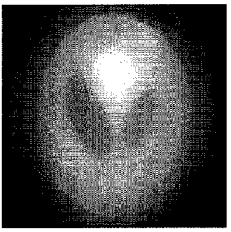
FIG. 5 illustrates an iterative MAP result versus an FBP-MAP in accordance with an embodiment of the present application with $\beta=0.4$.
Figure 5:
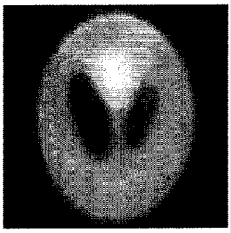
Figure 5:
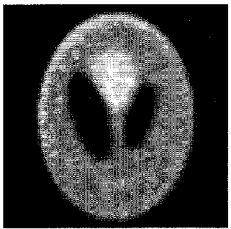
Figure 5:
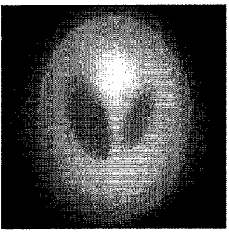
Figure 5:
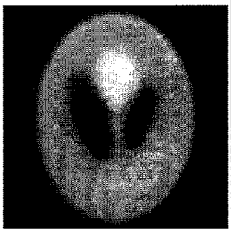
Figure 5:

FIG. 5 illustrates an iterative MAP result versus an FBP-MAP in accordance with an embodiment of the present application with $\beta=0.4$. FIG. 5 illustrates results when using an iteration index of k=2, 20, and 200. As can be seen when Bayesian term influence is over emphasized by a larger $\beta$, the resolution of the image suffers.

Figure 6:
FIG. 6 illustrates an iterative MAP result versus an FBP-MAP in accordance with an embodiment of the present application with $\beta=0.4$ while also using non-uniform angular sampling.
Figure 6:
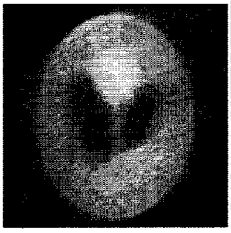
Figure 6:
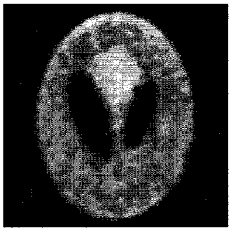
Figure 6:
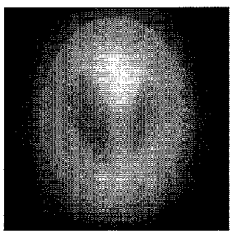
Figure 6:
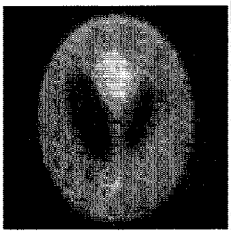
Figure 6:
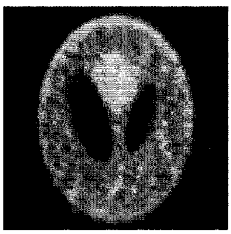

FIG. 6 illustrates an iterative MAP result versus an FBP-MAP in accordance with an embodiment of the present application with $\beta=0.4$ while also using non-uniform angular sampling. FIG. 6 illustrates results when using an iteration index of k=2, 20, and 200. The sampling interval in this example is 1° for $0 \leq \theta < \pi/4$ and 3° for $\pi/4 \leq \theta < \pi$; the density function is given in (10). As can be seen, in early iterations, the results of the iterative MAP algorithm contains 45° directional blurring due to the non-uniform angular sampling effect, but the FBP-MAP algorithm does not have this artifact. As such, the novel FBP-MAP embodiment produces superior results while handling non-uniform sampling data.

As shown, novel algorithm embodiments are shown herein which have a window function with an index k that can emulate the iterative Landweber MAP algorithm of the kth iteration. Computer simulations show that the FBP-MAP algorithm and the iterative MAP algorithm give very similar images and noise texture if they have the same index k, same parameter $\alpha$, and same parameter $\beta$. A significant advantage of the FBP-MAP algorithm is its fast computation time; the iterative MAP algorithm is 2k times slower. Another advantage of the FBP-MAP algorithm is that it may have a shift-invariant point-spread-function (e.g., uniform resolution). On the other hand, the iterative algorithm has a non-uniform resolution convergent rate. When the sampling is non-uniform, the embodiments of the new algorithms described herein are able to compensate for the non-uniformity using a normalization factor.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reconstructing an image, said method comprising:
   receiving raw image data acquired from an image acquisition system;
   shaping a filtered backprojection filter to emulate a specified iteration result of an iterative algorithm reconstruction method;
   filtering said received image data utilizing said shaped filtered backprojection filter;
   backprojecting said received image data; and
   generating a reconstructed image using the filtered and backprojected image data.

2. The method of claim 1 wherein said shaped filtered backprojection filter provides a substantially shift invariant filter.

3. The method of claim 1 wherein shaping said filtered backprojection filter includes providing at least one index k which corresponds to the kth iteration of said iterative algorithm.

4. The method of claim 1 wherein said shaping creates a window function having a parameter $\alpha$ corresponding to the step-size of the iterative algorithm, and a parameter R that is a relative weighting between a fidelity term and the Bayesian term.

5. The method of claim 1 wherein said filtering is implemented prior to said backprojecting step.

6. The method of claim 1 wherein said backprojecting is implemented prior to said filtering step.

7. The method of claim 1 wherein said emulation is that of an iterative MAP algorithm.

8. The method of claim 1 wherein the raw image data is received in the form of a Radon transform.

9. A image processing system comprising:
   an input configured to receive raw image data from an image acquisition device; and
   a processing device configured to use a filter to filter and backproject the raw image data in order to produce a resulting image, wherein said resulting image emulates a resulting image of an iterative reconstruction algorithm, wherein said filter is shaped using at least one index k which corresponds to the kth iteration of said iterative algorithm.

10. The image processing system of claim 9 wherein said filter includes a window function having a parameter $\alpha$ corresponding to the step-size of the iterative algorithm, and a parameter $\beta$ that is a relative weighting between a fidelity term and the Bayesian term.

11. The image processing system of claim 9 wherein iterative reconstruction algorithm is a Landweber reconstruction algorithm.

12. The image processing system of claim 9 wherein the image acquisition device is a tomography device.

13. The image processing system of claim 12 wherein the image acquisition device is at least one of an x-ray computed tomography, positron emission tomography, single photon emission computed tomography, and magnetic resonance imaging device.

14. A method comprising:
   receiving raw image data which has been generated by an imaging device;
   receiving at least one filter parameter configured to shape a filter to emulate a result of an iterative reconstruction technique for an iteration corresponding to said received parameter;
   filtering said raw image data utilizing a filter configured with said at least one filter parameter; and
   generating an image using said filtered raw image data.

15. The method of claim 14 wherein the imaging device is a tomography device.

16. The method of claim 15 wherein the imaging device is at least one of a x-ray computed tomography, positron emission tomography, single photon emission computed tomography, and magnetic resonance imaging device.

17. The method of claim 14 wherein the raw image data is in the form of a Radon transform.

18. The method of claim 14 wherein the raw image data is in the form of a Radon transform.

19. The method of claim 14 wherein the raw image data is in the form of at least one of a ray-sum, plane-sum, and k-space data.

20. The method of claim 19 wherein the data acquisition trajectory of said raw image data can be one of a regular circle, helix, and an irregular shape.

21. The method of claim 14 wherein said filter is a substantially shift invariant filter.

* * * * *